United States Patent [19]
Leplingard et al.

[11] Patent Number: 5,508,941
[45] Date of Patent: Apr. 16, 1996

[54] NETWORK WITH SURVEILLANCE SENSORS AND DIAGNOSTIC SYSTEM, AND METHOD OF ESTABLISHING DIAGNOSTICS FOR THE NETWORK

[75] Inventors: Bruno Leplingard, Orsay; Hassan Laasri, Arpajon, both of France

[73] Assignee: Alcatel N.V., Amsterdam, Netherlands

[21] Appl. No.: 316,051

[22] Filed: Sep. 30, 1994

Related U.S. Application Data

[63] Continuation of Ser. No. 993,942, Dec. 16, 1992, abandoned.

[30] Foreign Application Priority Data

Dec. 20, 1991 [FR] France ................... 91 14954

[51] Int. Cl.⁶ .................................................... H04M 3/22
[52] U.S. Cl. ................ 364/514 B; 395/54; 340/825.06; 324/260
[58] Field of Search .............................. 364/550, 551.01, 364/514; 395/61, 54, 909; 371/5.5; 340/825.06, 825.16; 324/260, 501, 528, 750, 637

[56] References Cited

U.S. PATENT DOCUMENTS

| | | | |
|---|---|---|---|
| 4,713,810 | 12/1987 | Chum | 371/20.1 |
| 4,730,313 | 3/1988 | Stephenson et al. | 371/5.5 |
| 4,872,165 | 10/1989 | Mori et al. | 371/20.1 |
| 4,937,825 | 6/1990 | Ballard et al. | 371/20.1 |
| 4,959,849 | 9/1990 | Bhusri | 379/32 |
| 5,063,523 | 11/1991 | Vrenjak | 364/514 |
| 5,122,976 | 6/1992 | Bellows et al. | 364/550 |
| 5,133,046 | 6/1992 | Kaplan | 395/61 |
| 5,189,663 | 2/1993 | Williams | 371/20.1 |
| 5,189,674 | 2/1993 | Shimizu | 371/20.1 |
| 5,293,323 | 3/1994 | Doskocil et al. | 364/551.01 |

OTHER PUBLICATIONS

Taylor; How Expert Systems Can Support Network Diagnostics, Management And Control; 1988 (No Month) pp. 159–164.

Paul H. Callahan, "Expert Systems for AT&T Switched Network Maintenance"; *AT&T Technical Journal*, vol. 68, No. 1, 1988, pp. 93–103.

Lawrence Bernstein, "Expert Systems in Network Management—The Second Revolution", *IEEE Journal on Selected Areas in Communications*, vol. 6, No. 5, Jun. 1988, pp. 784–787.

*BT Technology* vol. 9 No. 3; 1991 (Index & Abstracts only).

*Primary Examiner*—Ellis B. Ramirez
*Assistant Examiner*—Thomas Peeso
*Attorney, Agent, or Firm*—Robbins, Berliner & Carson

[57] ABSTRACT

A network, in particular a telecommunication network, with surveillance sensors and a diagnostic system comprises equipment for conveying signals to network users, sensors for supplying data on network operation and a diagnostic system processing this data to establish diagnostics designating causes of degraded operation. The diagnostic system performs diagnostic evaluation to request secondary data if a previously established diagnostic is insufficient.

7 Claims, 3 Drawing Sheets

NETWORK WITH SURVEILLANCE SENSORS AND DIAGNOSTIC SYSTEM, AND METHOD OF ESTABLISHING DIAGNOSTICS FOR THE NETWORK

CROSS REFERENCE TO RELATED APPLICATIONS

This is a continuation of application Ser. No. 07/993,942 filed 16 Dec. 1992, now abandoned.

BACKGROUND OF THE INVENTION

1. Field of the Invention

The present invention concerns the implementation of a network for conveying between network users material or immaterial entities referred to hereinafter as signals. These signals may be, for example, electromagnetic waves or electrical currents conveying data to be transmitted between the users or electrical power to be distributed or fluids such as a combustible gas, water or oil, etc.

A network of this kind comprises equipments adapted to perform various functions enabling these signals to be conveyed. These equipments may be, for example, microwave relay transmitter-receivers, telephone switching centers, electricity substations, pumping stations, etc. The distances between them depend on the distances between network users. They may be degraded in ways leading to partial or total failure of the network.

2. Description of the Prior Art

A known way of carrying out surveillance to enable effective network maintenance is to provide sensors adapted to produce data periodically or on demand. These sensors are referred to hereinafter as "surveillance sensors". This data may constitute a more or less direct representation of the functional capabilities of the equipments and other like data may represent characteristics of the signals conveyed.

The surveillance data must be acted on to establish a diagnostic. To be more precise, if an alarm indicates that the network is degraded, before undertaking any repair or exploratory work on any of the equipments in the network it is desirable to determine which equipment requires repair and, if this equipment is a composite unit, which of its capabilities is degraded, this determination constituting a diagnostic. It is already possible for a diagnostic to be established, at least in part, by a computer-based automatic diagnostic system. The use of a system of this kind has various advantages, especially from the points of view of network operating cost and security and speed of repair. A diagnostic system of this kind is described in the article "Expert Systems for AT&T Switched Network Maintenance" (Paul H. Callahan, AT&T Technical Journal, pp. 263–273, 1988). Also of relevance on this topic is a special issue of "British Telecom Technological Journal" (Vol 9, N° 3, July 1991) on telecommunication network management.

The known diagnostic system receives surveillance data via a surveillance transmission system provided for this purpose. The diagnostic system systematically receives substantially all available surveillance data so that it can establish a diagnostic having the best possible attributes. The attributes of the diagnostic to be taken into consideration include its accuracy and the probability that it is correct.

In any network of this kind the cost of diagnosing faults can constitute a non-negligible part of total network operating costs. It includes the cost of installing, maintaining and operating the sensors, the surveillance transmission system and the diagnostic system.

Objects of the present invention are:

to reduce the average cost of the diagnostic, and/or to enhance the diagnostic by increasing the number of items of surveillance data available without increasing the capacity of the surveillance transmission system or the processing power of the diagnostic system.

SUMMARY OF THE INVENTION

The present invention consists in a network with surveillance sensors and diagnostic system comprising equipments for conveying signals of utility to network users, sensors for supplying data on the operation of the network and a diagnostic system processing said data to establish diagnostics identifying causes of degraded operation, in which network said diagnostic system comprises a diagnostic evaluation subsystem for requesting secondary data if a diagnostic previously established is insufficient.

How the present invention may be put into effect is described by way of non-limiting example hereinafter with reference to the appended diagrammatic drawings. If an item is shown in more than one figure it is always identified by the same reference symbol.

DETAILED DESCRIPTION OF THE INVENTION

The various elements of networks in accordance with the present invention and in particular those of the network to be described by way of example will first be outlined with reference to these figures.

The function of the network is to convey signals which are of utility to its users.

Figure 2:
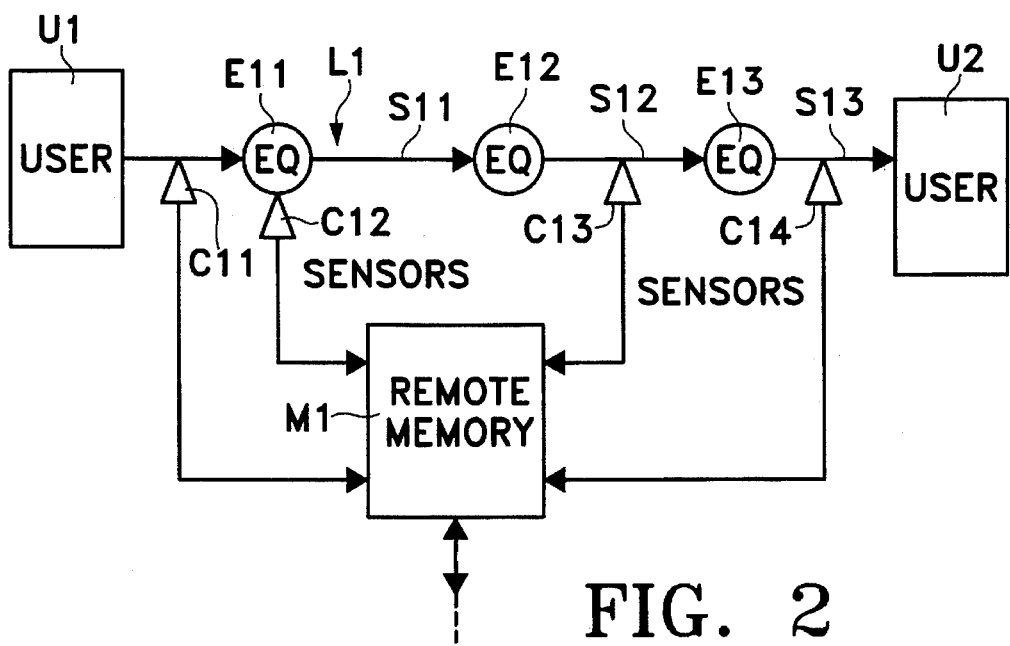
FIG. 2 is a block diagram of one link of this network.

It comprises various elements which, in respect of their functions as described hereinafter, it shares with prior art networks. This applies firstly to equipments E11, E12, E13, E21, E22 and E23, E51, E53. These equipments implement network sections S11, S12, S13 (see FIG. 2) each associated with an equipment identified by a reference symbol including the same digits as the section. Each section such as S11 or S13 extends in an upstream to downstream direction from the associated equipment such as E11 or E13 to a receiver of that section. This receiver may be another equipment such as E12 whose reference symbol includes a digit one greater than that of the associated equipment E11 or it may be a user such as U2.

Each equipment is adapted to receive incident signals and to respond by sending emergent signals to the receiver of the associated section.

The sections of the network constitute at least one link such as L1, L2 or L5. The section L1, for example, has an upstream to downstream direction. It consists of the sections S11, S12, S13 which extend in and are in sequence in this upstream to downstream direction to connect an upstream user U1 to a downstream user U2 of this link. The upstream user sends signals to the equipment E11 associated with the first section S11 of the link. The equipment associated with each other section of the link such as the section S12 is that such as the equipment E12 which constitutes the receiver of the preceding section S11. The downstream user U2 constitutes the receiver of the last section S13 of this link.

The functional capabilities of the equipment may be normal or degraded. The signals have characteristics which may be normal or degraded. A signal for which all its characteristics are normal constitutes a normal signal. Each section may be normal .or degraded. It is normal if first and second conditions are satisfied simultaneously. The first condition is that the equipment associated with that section is able to receive a normal incident signal. The second condition is that the functional capabilities of the associated equipment are normal. These functional capabilities are normal if a normal incident signal causes the associated equipment to send a normal emergent signal. If a functional capability of an equipment is degraded, this may prevent this section from being normal and then degrades at least this section and in many cases subsequent sections of the same link.

The operation of a network of this kind must therefore be monitored. This is why it comprises sensors such as C11, C12, C13 and C14 which are spaced from each other and adapted to send surveillance data representative of functional capabilities of the equipments and/or characteristics of the signals. Some of this surveillance data, either in isolation or in combination, may constitute alarms to be processed and each indicating that at least one section of a link is degraded although the upstream user of the link is sending normal signals.

To enable effective low-cost network maintenance based on this surveillance data the network includes a computer-based diagnostic system (DS) 2 which receives some of the surveillance data. This system is adapted to recognize alarms to be processed. If it recognizes an alarm it processes some of the surveillance data to establish a diagnostic which indicates a functional capability of an equipment as probably degraded and constituting the reason for which the section is degraded, as indicated by the alarm.

Finally, a surveillance transmission system 4 is provided to convey surveillance data from the sensors to the diagnostic system.

According to the present invention, the surveillance transmission system is controlled by requests for data output by the diagnostic system. In the absence of any request for data the surveillance transmission system sends to the diagnostic system some of the surveillance data so that it can at least recognize alarms. This data is referred to hereinafter as primary data. In the presence of a request for data the surveillance transmission system sends to the diagnostic system further surveillance data referred to hereinafter as secondary data.

Figure 4:
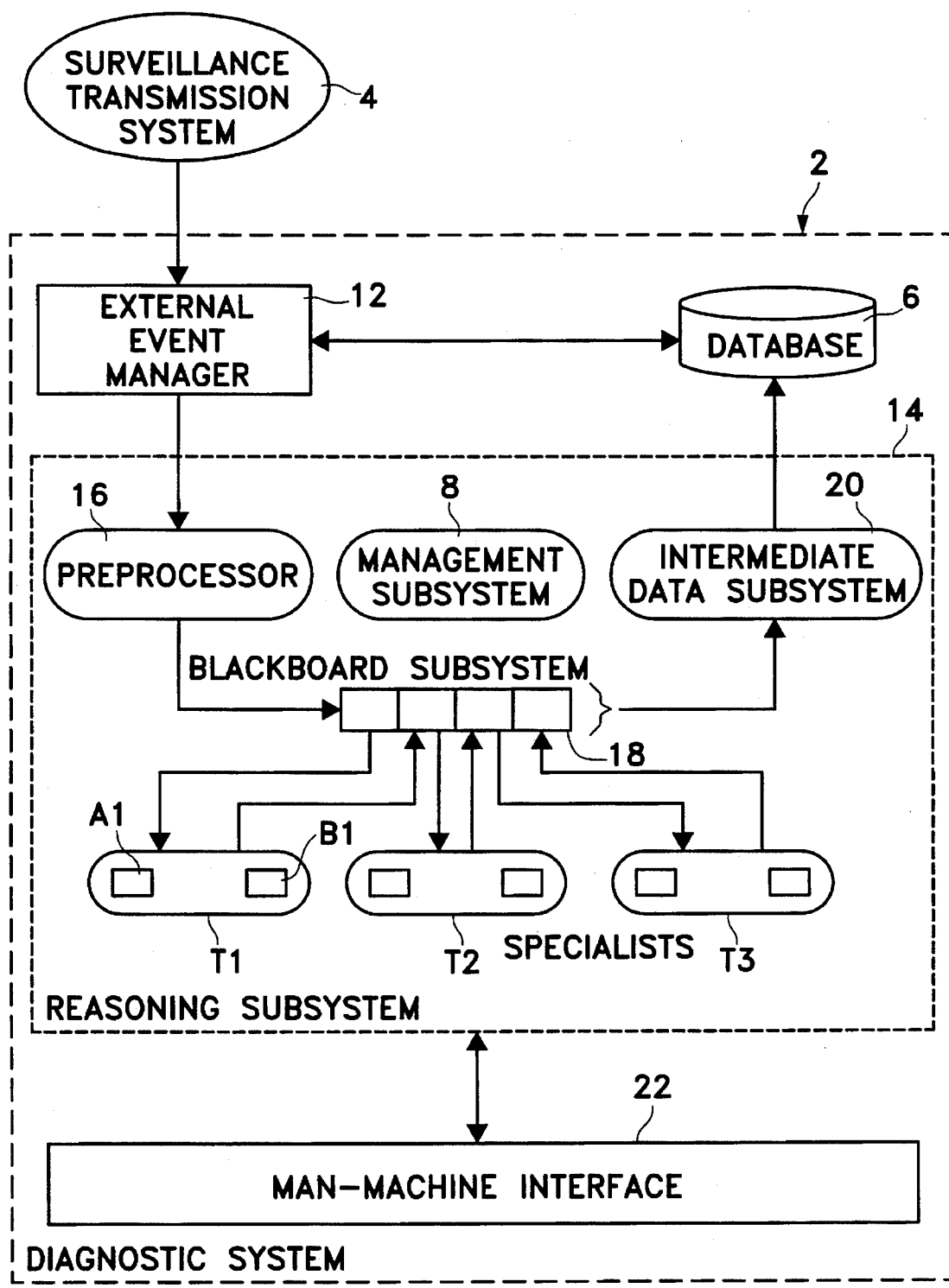
FIG. 4 is a block diagram of a diagnostic system of this network.

The diagnostic system must therefore have functions that are more diverse than if it were simply required to establish a diagnostic. For this reason it comprises two systems:

A diagnostic subsystem such as A1 (see FIG. 4) receives surveillance data sent to the system 2. When an alarm is present it processes this data to establish a diagnostic. This diagnostic constitutes a primary or secondary diagnostic according to whether the data comprises only primary data or primary and secondary data, respectively.

A diagnostic evaluation subsystem B1 is associated with the diagnostic subsystem. It evaluates an attribute of each primary diagnostic established by the associated diagnostic subsystem and sends a request for data if the attribute evaluated is below a preestablished threshold.

The network preferably further comprises surveillance memories for storing some surveillance data, some of these memories constituting remote memories M1 . . . M5 located at a distance from the diagnostic system 2. The surveillance transmission system 4 conveys secondary data from sensors C12, C13, C14, etc to these remote memories in the absence of any request for data and from these remote memories to the diagnostic system when a request for data is present.

The diagnostic subsystem A1 and the evaluation subsystem B1 are preferably expert systems using knowledge bases grouped together in a common base 6.

The diagnostic system 2 preferably further comprises essentially hardware implemented data processing means such as processors and memories, in particular the database 6, and software modules utilizing these data processing means. These modules include:

- A plurality of selectively activated specialists T1, T2, T3. Each specialist is adapted to receive and to process surveillance data to establish diagnostics when it is activated. It is assigned to a family of situations each comprising a combination of ways in which the network can be degraded. Each specialist (the specialist T1, for example) has a knowledge base that can be within the base 6, a diagnostic subsystem such as the subsystem A1 and an evaluation subsystem such as the subsystem B1, in association. In many cases it is preferable for the knowledge base of each specialist to be integrated into the specialist.

- A management subsystem 8 adapted to receive and process at least the surveillance data for determining a family of situations implied by the data. This subsystem activates one or other of the specialists T1, T2, T3 depending on the family of situations determined in this way.

The network chosen as an example will now be described in more detail. The network comprises five microwave links L1 through L5 conveying electromagnetic signals embodying data of utility to users U1 through U4.

Figure 1:
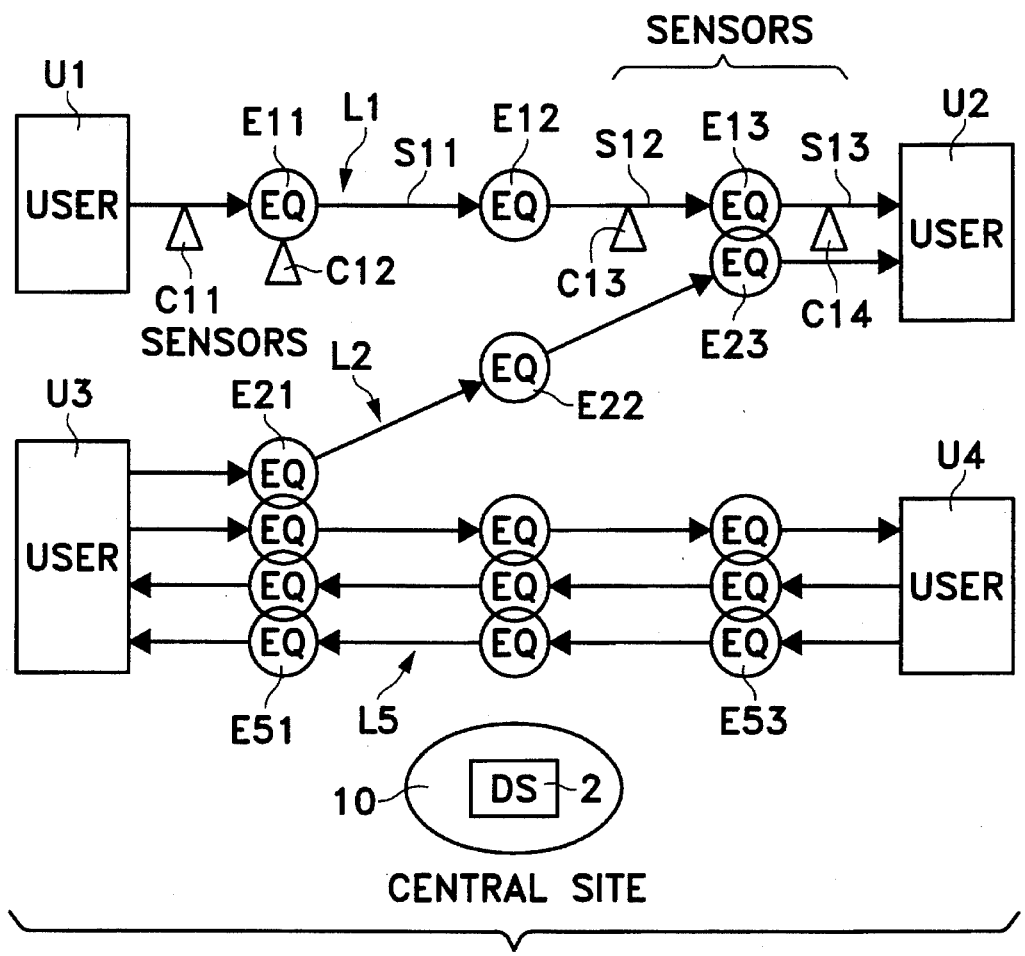
FIG. 1 is a block diagram of a microwave link network in accordance with the present invention.

Each microwave link L1 through L5 (see FIG. 1), the link L1, for example, comprises a set of microwave equipments E11 through E13 which may be either terminal equipments like E11 and E13 if they are at an end of the link or relay equipments like E12. In this example the equipments in question are those of the Alcatel 9439BH family manufactured by the French company Alcatel. A part-link such as L11 delimited by two consecutive microwave equipments such as E11 and E12 is called a link section. A link utilizes a plurality of frequency channels transmitting microwave signals in parallel: each channel is assigned a specific frequency of the microwave signal conveyed. In addition to the channels used to transmit data, the link includes a backup channel: if transmission fails on one channel the data to be conveyed by that channel is switched to the backup channel.

To provide the link each relay equipment such as E12 transmits the microwave signals that it receives from the equipment such as E11 on its upstream side to the equipment such as E13 on its downstream side. A microwave link is degraded if any of the characteristics of the microwave signal to be transmitted is degraded.

The operation of the microwave equipment is monitored all along the link L1 by sensors C11 through C13 which record the trend of certain microwave signal characteristics (power, error rate, frame structure, etc). All the data collected by the sensors is initially collated by one of the equipments of the link in local memories (not shown) used to store surveillance data. The limited capacity of these local memories requires them to be dumped periodically and rules out archive storage of all link surveillance data. A digital operations assistance system is responsible at each link L1 through L5 for collecting and temporarily storing surveillance data. It constitutes the respective remote memory M1 through M5.

Figure 3:
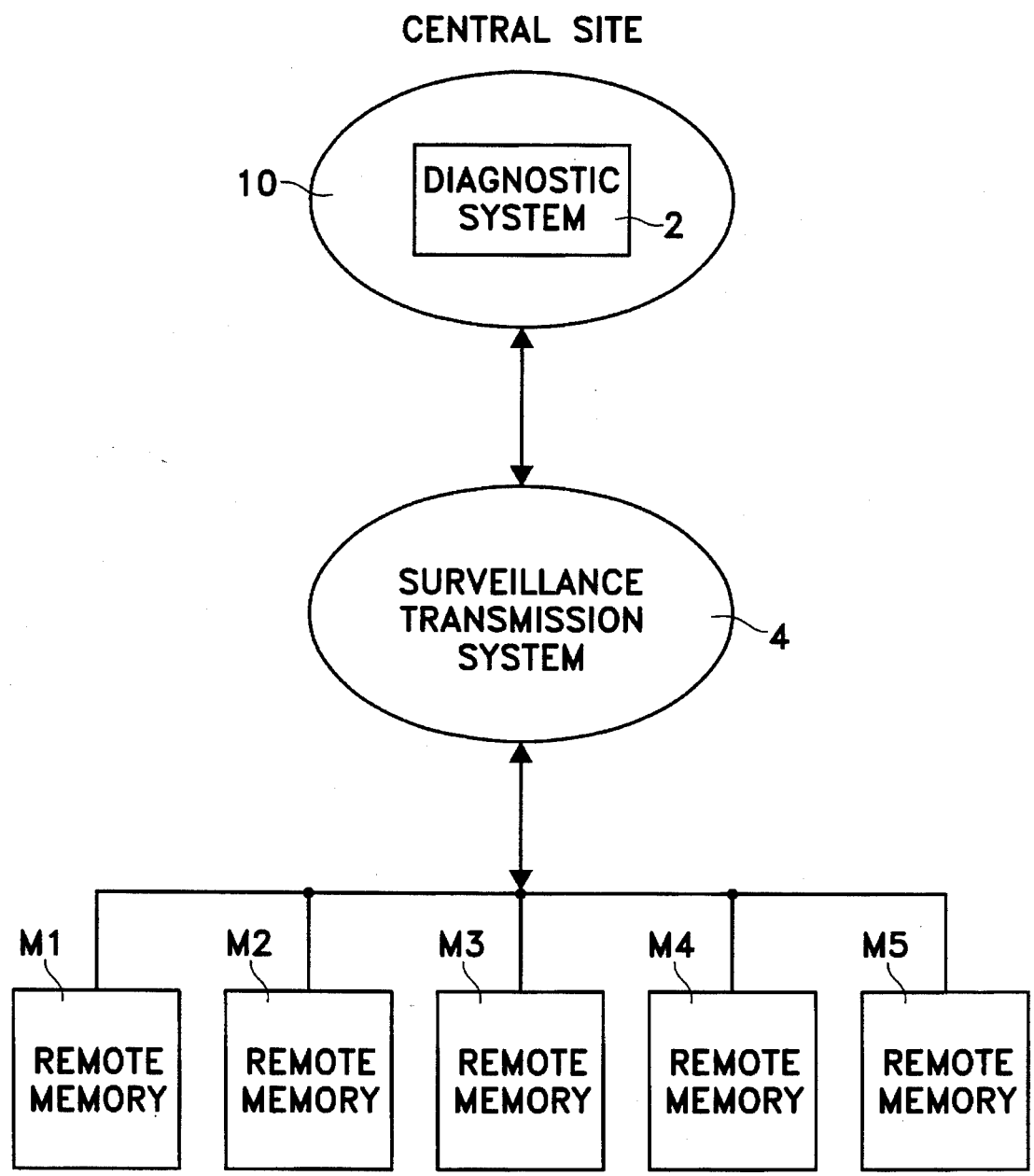
FIG. 3 is a block diagram of a surveillance transmission system of this network.

The collated data is then sent over surveillance transmission lines (see FIG. 3) separate from the microwave network under consideration to a central supervisory site 10 where it is analyzed. The format of the data sent is the AS&C (Alarm Status and Control) format. The lines and the systems that they manage form the surveillance transmission system 4 previously referred to.

Problems occurring during operation of the microwave network are diagnosed at the central supervisory site at which the collated surveillance data relating to all network elements is grouped together. The central supervisory site also has functions other than diagnostics, essential to good operation of the network, such as traffic management, charging management, etc.

The diagnostic is established as follows:

The diagnostic system 2 (see FIG. 4) acquires continuously the collated surveillance data reaching it systematically via the surveillance transmission system 4. A first analysis of this data is carried out by an external event manager 12. The object of this first analysis is to establish if the surveillance data indicates a serious problem on the corresponding link. To this end the data is compared with normal operation templates for the various characteristics of the microwave signals: power trend, presence of partial alarms, order of magnitude of error rates. If the surveillance data indicates possible malfunctioning of the link and therefore constitutes an alarm to be processed a description of the problem is built by combining all the data relating to the degraded link over a predetermined time period. Once it has been constructed this problem description is sent to a reasoning subsystem 14 which inserts it into a list of problems to be processed.

The problems are processed by software modules T1, T2, T3 known as specialists which each contain the knowledge needed to diagnose a particular family of problems:

the channel specialist T1 has the knowledge needed to generate hypotheses for explaining problems occurring on a channel.

the link specialist T2 has the knowledge needed to combine at a link the hypotheses generated for each of the channels constituting it.

the network expert specialist T3 has the knowledge needed to combine at network level the hypotheses generated for each of the links constituting it.

The list of problems to be processed is then consulted by the management subsystem 8 which chooses the most urgent problem and the most suitable specialist for solving that problem.

Activation of the specialist chosen to solve the problem produces a set of hypotheses that might explain the problem.

The set of hypotheses generated by the diagnostic subsystem such as A1 of a specialist such as T1 is evaluated by the associated diagnostic evaluation subsystem such as B1 allowing for parameters such as the accuracy of the diagnostic produced, its credibility, etc. If the result of this evaluation is considered insufficient a request is produced by the diagnostic evaluation subsystem to have secondary data concerning the relevant network element forwarded to the diagnostic system. This request is then sent to the digital operations assistance system of the respective link via the surveillance transmission system.

When the secondary data has been combined by the link it is sent to the diagnostic system via the surveillance transmission system. It is processed as previously by the diagnostic subsystem A1 in an attempt to refine the diagnostic established on processing the primary data.

The data transmitted to and from the various specialists passes through a "blackboard" subsystem 18 which communicates at the input with the external event manager 12 via a preprocessor 16. The subsystem 18 further communicates with the database 6 via an intermediate data subsystem 20.

The diagnostic system also comprises a database 6 used to save established diagnostics and a man-machine interface 22 enabling an operator to access the functions of the management system.

There is claimed:

1. Network with surveillance sensors and diagnostic system comprising a communication network for conveying information signals to network users, a distributed sensor system including a plurality of surveillance sensor elements for supplying and processing raw data into primary data and secondary data relating to the operation of the communication network, said primary data constituting alarms that represent degraded operation of specified portions of the communication network and that are automatically transmitted over the communication network, said secondary data being supplied only on request, and a diagnostic system for receiving and processing said primary and secondary data to establish diagnostics identifying causes of said degraded operation, said diagnostic system being connected to said distributed sensor system by said communication network, said diagnostic system further comprising a diagnostic evaluation subsystem for automatically requesting said secondary data from said distributed sensor system if and only if a diagnostic previously established by processing only said primary data does not meet a predetermined criterion.

2. Network according to claim 1 wherein said signals are conveyed to carry data and to transmit it to network users.

3. Network adapted to convey communication signals between network users and comprising:

equipments implementing respective associated sections of the network, each section having an upstream-downstream direction and extending in said direction from a respective equipment associated with said section to a receiver of said section constituted by another equipment or by a network user, each equipment having functional capabilities enabling it to receive incoming signals and for enabling it, in response to said incoming signals, to send emergent signals to its associated receiver, said sections constituting at least one link having an upstream-downstream direction and comprising sections extending in sequence in said upstream-downstream direction to connect an upstream user to a downstream user of said link, said upstream user sending emergent signals to an equipment associated with a first section of said link, the equipment associated with each other section of said link comprising the receiver of a preceding section, said downstream user constituting the receiver of a last section of said link, the functional capabilities of each of said equipments being normal or degraded, each of said incoming and emergent signals having normal or degraded characteristics, an incoming or emergent signal of which all said characteristics are normal constituting a normal signal, each section being normal or degraded, said section being normal if first and second conditions are simultaneously satisfied, said first condition being that the equipment associated with said section is able to receive a normal incoming signal, said second condition being that the functional capabilities of said associated equipment are normal, said functional capabilities being normal if a normal incoming signal causes a normal emergent signal to be sent by said associated equipment, degradation of a functional capability of an equipment possibly preventing said section from being normal and then constituting a cause of at least said section being degraded;

a distributed sensor system including a plurality of sensor elements disposed remotely of each other to send surveillance data representing functional capabilities of said equipments and/or characteristics of said incoming or emergent signals, some of said surveillance data constituting alarms each representing degradation of at least one section of a link the upstream user of which is sending normal signals;

a computer-based diagnostic system separate from said sensor system and adapted to receive said alarms, said system being adapted to react to one of said alarms by processing the surveillance data constituting said one alarm to establish a diagnostic whereby a functional capability of an equipment is designated as probably degraded and causing section degradation as indicated by said alarm; and a surveillance transmission system for conveying said surveillance data from said sensors to said diagnostic system, said surveillance transmission system being controlled by data requests sent by said diagnostic system, said surveillance transmission system sending to said diagnostic system in the absence of any request for data only primary surveillance data comprising said alarms, said surveillance transmission system transmitting to said diagnostic system only in the presence of a request for data secondary surveillance data not included in said primary surveillance data, wherein said diagnostic system further comprises:
  a diagnostic subsystem receiving the primary secondary surveillance data transmitted to said diagnostic system and processing said data to establish a diagnostic constituting a primary or secondary diagnostic according to whether said data comprises only said primary data or both said primary data and said secondary data, respectively; and
  an evaluation subsystem associated with said diagnostic subsystem to automatically evaluate an attribute of each primary diagnostic established by the associated diagnostic subsystem and to automatically send a request for data if and only if the attribute evaluated is below a predetermined threshold.

4. Network according to claim 3 further comprising surveillance memories for storing some of said surveillance data, some of said memories constituting remote memories situated remotely of said diagnostic system, said surveillance transmission system conveying said secondary data from said sensors to said remote memories in the absence of any request for data and from said remote memories to said diagnostic system in the presence of a request for data.

5. Network according to claim 3 wherein said diagnostic system comprises knowledge bases and said diagnostic and evaluation subsystems are expert systems which use said knowledge bases.

6. Network according to claim 5 wherein said diagnostic system comprises
  data processing means and software modules using said data processing means and constituting a plurality of specialists which can be selectively activated, each specialist being adapted to receive and to process said surveillance data to establish a diagnostic when it is activated, each specialist being assigned to a family of situations each comprising a combination of ways in which the network may be degraded, each specialist having a knowledge base, a diagnostic subsystem and an evaluation subsystem, and
  at least one management subsystem adapted to receive and to process at least said surveillance data to determine a family of situations implied by said data and to activate one or other of said specialists according to the family of situations thus determined.

7. Method of establishing diagnostics for networks comprising the following automated operations:
  sending surveillance data representing functional capabilities of equipments of the network and/or representing characteristics of signals conveyed by link sections formed by said equipments from a distributed sensor system to a remote diagnostics system, some of said surveillance data constituting alarms representing degradation of said sections, other of said surveillance data constituting secondary data, at least said secondary data being sent only on request,
  establishing primary diagnostics in said remote diagnostics system by processing only said alarms to designate a degraded functional capability assumed to be the cause of degradation of a section as indicated by said alarm,
  determining attributes for at least some of the thus-established primary diagnostics,
  sending a request for said secondary data from said remote diagnostics system to said sensor system if and only if the primary diagnostic has an attribute below a predetermined threshold, and
  establishing a secondary diagnostic by processing said secondary data in said remote diagnostic system.

* * * * *